(12) United States Patent
Hubbard

(10) Patent No.: US 12,737,130 B1
(45) Date of Patent: Sep. 15, 2026

(54) BURST POWER FOR ASYNCHRONOUS POWER LOSS IN A MEMORY DEVICE

(71) Applicant: MICRON TECHNOLOGY, INC., Boise, ID (US)

(72) Inventor: Daniel Jerre Hubbard, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/173,994

(22) Filed: Apr. 9, 2025

(51) Int. Cl.
*G06F 3/06* (2006.01)

(52) U.S. Cl.
CPC .......... *G06F 3/0619* (2013.01); *G06F 3/0659* (2013.01); *G06F 3/0679* (2013.01)

(58) Field of Classification Search
CPC ..... G06F 3/0619; G06F 3/0659; G06F 3/0679
See application file for complete search history.

(56) References Cited

U.S. PATENT DOCUMENTS

2001/0032291 A1* 10/2001 Seiler .................... G06F 9/4418 713/320
2011/0022826 A1* 1/2011 More .................... G06F 9/4401 713/1
2013/0332765 A1* 12/2013 Costa ........................ G06F 1/26 713/340
2021/0344217 A1* 11/2021 Shaikh ...................... G06F 1/28
2022/0404894 A1* 12/2022 Shiraishi ............... G06F 1/3243

* cited by examiner

*Primary Examiner* — Kevin Verbrugge
(74) *Attorney, Agent, or Firm* — Lowenstein Sandler LLP

(57) ABSTRACT

A system can include a memory device and a processing device operatively coupled with the memory device, to perform operations including sending, to the host system, burst power mode data associated with the memory device, wherein the burst power mode data comprises a first parameter and a second parameter, wherein the first parameter indicates that the memory device supports a burst power mode, wherein the second parameter specifies a maximum power value provided by the burst power mode; receiving a power loss notification from the host system; responsive to receiving the power loss notification, enabling the burst power mode; identifying one or more data flushing operations to be performed based on a power budget defined according to the maximum power value provided by the burst power mode; and causing the one or more data flushing operations to be performed.

20 Claims, 7 Drawing Sheets

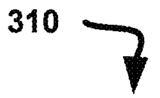
| Mode | Power Value |
|---|---|
| Burst power function disabled (Normal Power Mode) | X |
| Burst power function enabled (Burst Power Mode) | Y1, Y2, Y3, ... |
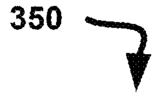
| 1st bit | 2nd bit | 3rd bit | 4th bit |
|---|---|---|---|
| Support | Y1, Y2, Y3, ... | X | Enable |
FIG. 3A

| Memory Device | Burst Power Support | Burst Power Setting | PLN |
|---|---|---|---|
| SSD1 | Yes/No | Maximum Power Value | Yes/No |
| ... | ... | ... | ... |

400

Receive, from a host system, a request associated with a burst power mode, wherein the burst power mode provides a maximum power value higher than a maximum power value provided in a normal situation
410

Send, to the host system, a response to the request, wherein the response comprises a first parameter and a second parameter, wherein the first parameter specifies that the memory device supports the burst power mode, and wherein the second parameter specifies at least one maximum power value provided by the burst power mode
420

Responsive to receiving a power loss notification from the host system, enabling the burst power mode
430

Identify one or more data flushing operations to be performed based on a power budget defined according to the maximum power value provided by the burst power mode; and
cause the one or more data flushing operations to be performed
440

FIG. 4

BURST POWER FOR ASYNCHRONOUS POWER LOSS IN A MEMORY DEVICE

TECHNICAL FIELD

Embodiments of the disclosure relate generally to memory sub-systems, and more specifically, relate to burst power for asynchronous power loss (APL) in memory devices.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 3A illustrates an example burst power register and the example description of the burst power register for implementing a burst power function in accordance with some embodiments of the present disclosure.

FIGS. 4-5 are flow diagrams of example methods for implementing a burst power function for APL in accordance with some embodiments of the present disclosure.

DETAILED DESCRIPTION

Figure 1:
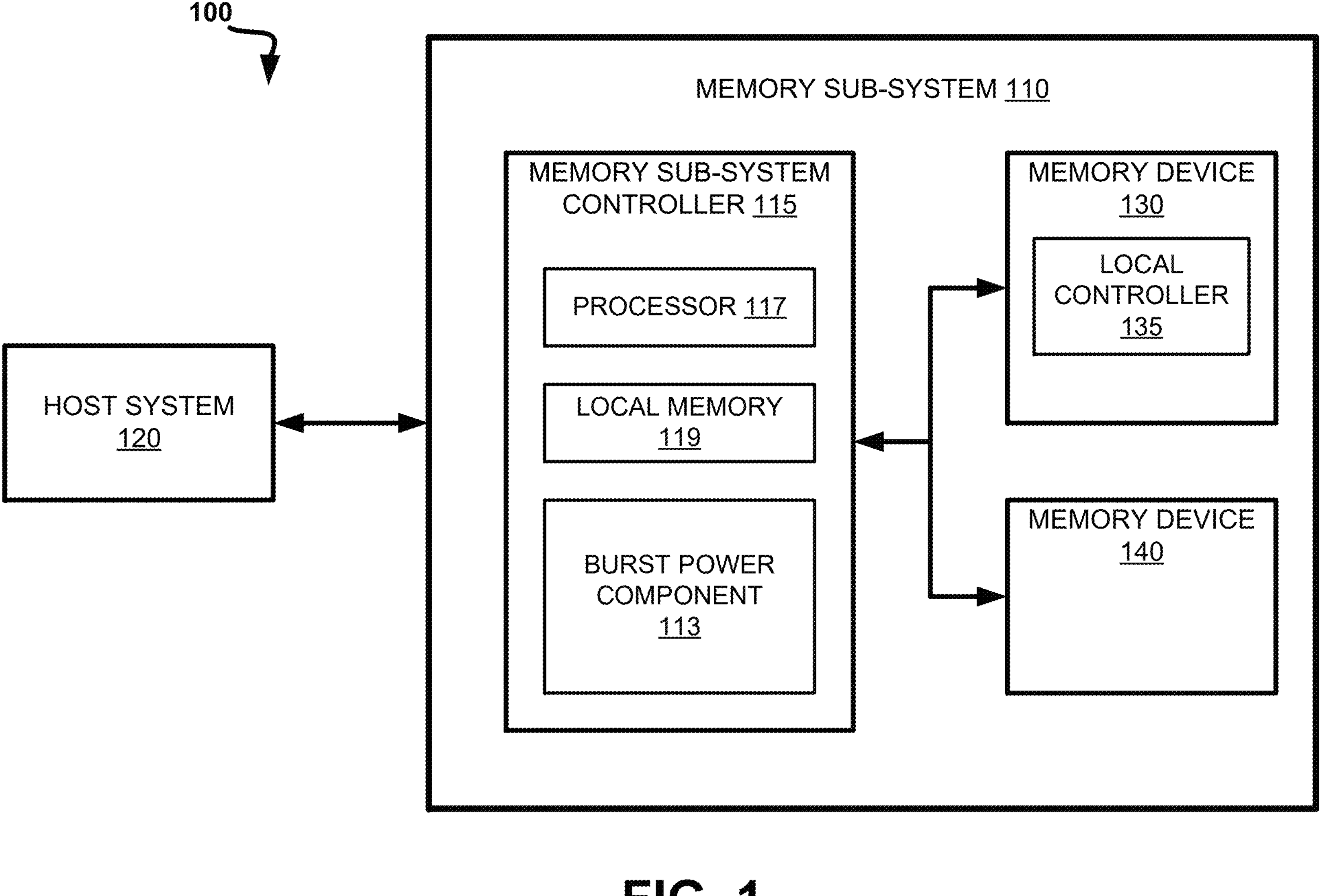
FIG. 1 illustrates an example computing system that includes a memory sub-system in accordance with some embodiments of the present disclosure.

Aspects of the present disclosure are directed to implementing a burst power function in the event of asynchronous power loss (APL) in memory devices. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a negative- and (NAND) memory device. Other examples of non-volatile memory devices are described below in conjunction with FIG. 1. A non-volatile memory device is a package of one or more dies. Each die can include one or more planes. For some types of non-volatile memory devices (e.g., NAND devices), each plane includes a set of physical blocks. Each block includes a set of pages. Each page includes a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can include a two-dimensional grid of memory cells, which are formed onto a silicon wafer in an array of columns and rows. A block hereinafter refers to a unit of the memory device used to store data and can include a group of memory cells that are electrically coupled to one or more conductive lines referred to as access lines or "wordlines." One or more blocks can be grouped together to form a plane of the memory device in order to allow concurrent operations to take place on each plane. The memory device can include circuitry that performs concurrent memory page accesses of two or more memory planes. For example, the memory device can include a respective access line driver circuit and power circuit for each plane of the memory device to facilitate concurrent access of pages of two or more memory planes, including different page types.

In host systems that utilize memory devices, there can be a delay between the time that data is sent to be stored and the time that the data actually gets recorded on the medium of the memory device. Similarly, there can be a delay between the time that data is requested to be retrieved from the memory device and the time it is actually received by the requesting component. These delays can occur due to the data having to pass through other components of the system before arriving at its destination and due to the latency of the read and write operations being executed on the medium of the memory device. As a result of these delays, a system or a memory device in a system may experience a power loss event, while there is still data that has been either requested or transmitted through components of the system or pending in a component to be written or retrieved when the power loss occurs, and such power loss can be referred to as an asynchronous power loss (APL). If a power loss event occurs while there is data in-flight and it is not saved in a non-volatile medium or securely retrieved by another component before complete power loss, it can be lost. Saving such data may require a sufficient power supply to permit the memory devices to complete the pending operations.

In the event of power loss, a memory device that includes internal power loss protection (PLP) circuitry can perform an emergency shutdown sequence, in which a component of a system (e.g., a microcontroller) detects a sudden drop of the power supply voltage and sends a notification across the system before the power supply is completely compromised due to the APL event. Some systems with non-volatile media devices can include capacitors that can provide power to the components of the system when the primary source of power is lost. However, in the case of that the memory device does not include internal PLP circuitry, the memory device can continue performing essential operations but suspend performing non-essential operations upon receiving APL notifications from the host. In some cases, the level of power supplied by the host following an APL notification can be higher than the level of power consumed by the memory device under normal operating conditions, and can be specially designed as such, considering the short duration of the APL. In some cases, when different levels of power are designed to be allocated to different components of the host system under normal operating conditions, the level of power supplied by the host following an APL notification for each component can be designed to be different during the APL. However, in some situations, this level of power may not be sufficient for performing the required operations before the memory device is powered off.

Aspects of the present disclosure address the above and other deficiencies by implementing a memory sub-system that can enable or disable a burst power function, which allows the memory sub-system to draw the power ("a maximum power value") higher than a value that is allowed to be drawn by the memory sub-system operating under the normal operating conditions (e.g., in the absence of APL events). That is, the maximum power value can define a power budget that represents a higher-than-normal maximum power drawn by the memory sub-system. Specifically, the memory sub-system may be manufactured with circuitry to support the operation with a burst power function and with firmware to configure the operation with a burst power function. The memory sub-system controller may store (e.g., in one or more configuration registers) the values of one or more parameters characterizing the burst power function. These parameters may include a parameter (e.g., first parameter) indicating whether the memory sub-system supports the burst power function, and a parameter (e.g., second parameter) indicating the maximum power value(s) that can be requested by the memory sub-system in the burst power function.

As a part of the power-on sequence, the host system may send to the memory sub-system a request for the information associated with the burst power function ("burst power function data"). The memory sub-system controller may check the values of the parameters to determine whether the memory sub-system supports the burst power function (e.g., the first parameter), and determine the maximum power value(s) allowed in the burst power function if the memory sub-system supports the burst power function (e.g., the second parameter). The memory sub-system controller may send, to the host system, in response to the request, the burst power function data that includes the values of the first and the second parameters. The host system may store the values of the first and the second parameters for future use of the burst power function.

Upon detecting an APL event, the host system may send a power loss notification (PLN) to the memory sub-system. The host system may check the stored value of the first burst power function parameter to determine whether the memory sub-system supports a burst power function. Responsive to determining that the memory sub-system supports the burst power function, the host system may check the stored value(s) of the second burst power function parameter to identify maximum power value(s) that can be requested by the memory sub-system in the burst power function. The host system may determine whether it can support the requested maximum power value(s). Based on the determination, the host system may select a value, from the requested maximum power value(s), that the host system can support as the maximum power value to be used in the burst power function for the memory sub-system. The host system may send, along with the PLN, to the memory sub-system, the maximum power value to be used in the burst power function for the memory sub-system.

Upon receiving the PLN and the maximum power value, the memory sub-system controller may enable the burst power function by changing, in the configuration file of the memory sub-system, a parameter that indicates whether the burst power function in enabled or not. When the burst power function of the memory sub-system is enabled, the memory sub-system may draw the power based on the power budget defined according to the maximum power value that is received from the host system. The memory sub-system may identify one or more data flushing operations to be performed based on the power budget. As such, the host system allows the memory sub-system to draw a higher-than-normal maximum power to complete the pending operations, such as the data flushing operations, in the event of power loss. This is especially useful when the memory device lacks internal PLP circuitry that can perform the emergency shutdown sequence, while the higher-than-normal maximum power drawn from the host system can be used to perform the emergency shutdown sequence.

Advantages of the present disclosure include allowing the memory sub-system to efficiently saving the critical data in an imminent power loss condition, by using the burst power function to draw the power higher than normal from the host system. The memory sub-system can use the extra power drawn from the host system, rather than using the power provided by the PLP circuitry, to perform the pending operations for the emergency shutdown sequence. In the absence of the PLP circuitry, aspects of the present disclosure can use the extra power drawn from the host system to save data, including the data that can facilitates an efficient restoration of the system (e.g., shorter recovery time) upon a power up following an APL. Aspects of the present disclosure allows the host system to configure the level of burst power (i.e., maximum power value) the memory sub-system that is allowed to use during power loss conditions.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller, CXL controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a compute express link (CXL) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe or CXL bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative- and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (MUs).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative- or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processors.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In some embodiments, the memory sub-system 110 includes a burst power component 113. In some embodiments, the memory sub-system controller 115 includes at least a portion of the burst power component 113. In some embodiments, the burst power component 113 is part of the host system 110, an application, or an operating system. In other embodiments, local media controller 135 includes at least a portion of burst power component 113 and is configured to perform the functionality described herein. Further details regarding the operations of the burst power component 113 are described below with reference to FIGS. 2-6.

It will be appreciated by those skilled in the art that additional circuitry and signals can be provided, and that the components of FIG. 1 have been simplified. It should be recognized that the functionality of the various block components described with reference to FIG. 1 may not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Figure 2:
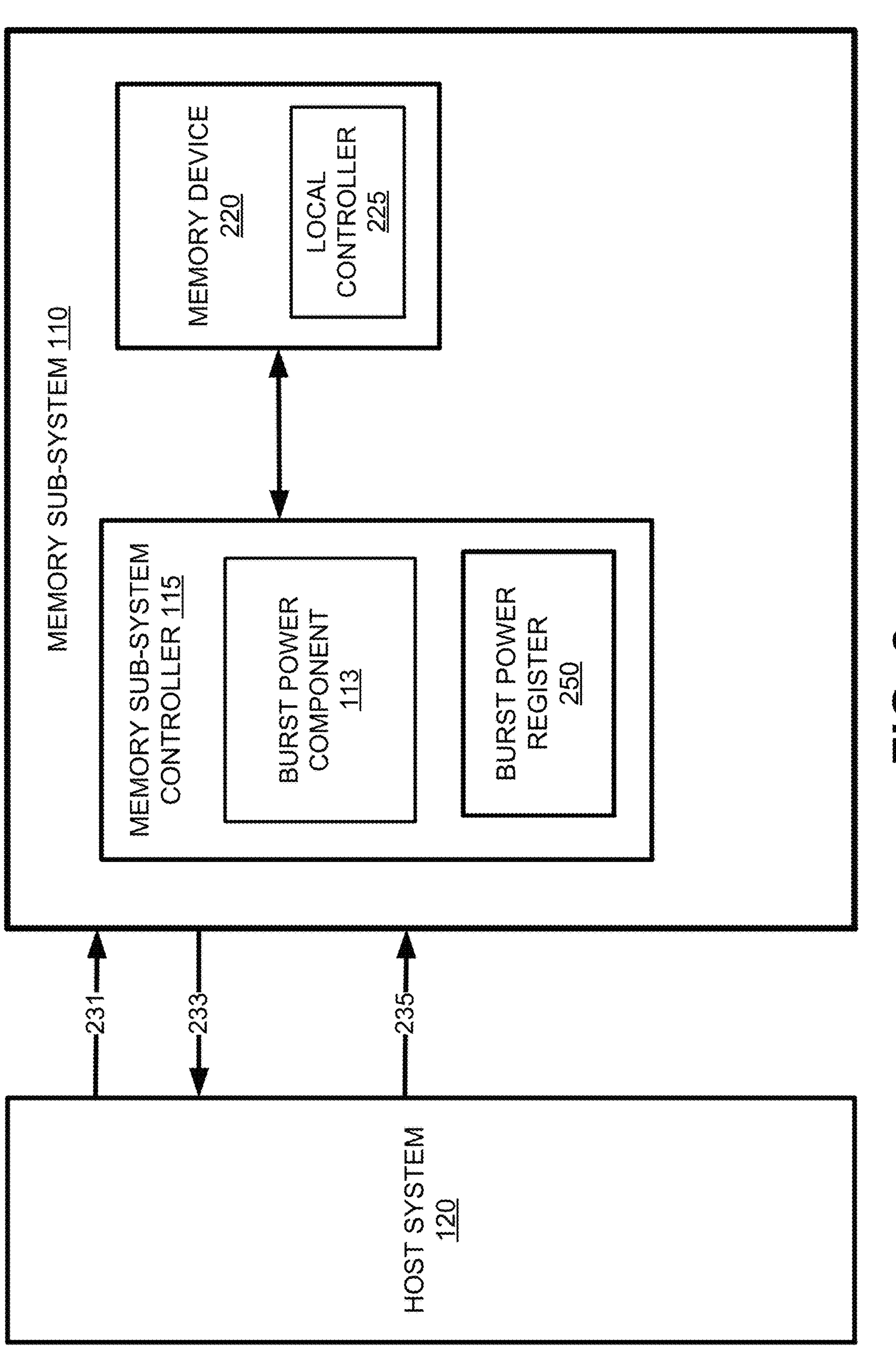
FIG. 2 is a block diagram of an example system for implementing a burst power function for asynchronous power loss (APL) in accordance with some embodiments of the present disclosure.

A more detailed depiction of an embodiment of the present disclosure that is shown in FIG. 2 includes an example memory sub-system 110 and can be understood with continued reference to FIG. 1. As shown in FIG. 2, the memory sub-system 110 can include the memory sub-system controller 115 that includes the burst power component 113 and a memory device 220. The memory sub-system controller 115 can also include a data store that stores the burst power register 250. In some implementations, the burst power register 250 may be included in the non-volatile memory device 220.

In some implementations, the memory device 220 may be manufactured and configured to be capable of operating under a burst power mode in certain situations (e.g., in the APL event) and operating under a normal power mode in a normal situation (e.g., in the absence of the APL event). The burst power mode is a mode that can be activated with a burst power function that allows the memory device 220 to draw a maximum power higher than a value that is allowed to be drawn by the memory device 220 operating in a normal situation absenting a power loss event. The normal power mode is the mode in which the memory device 220 operates in a normal situation absenting a power loss event.

Specifically, the host system 120 may send a request 231 to a memory sub-system 110 or the burst power component 113, where the request 231 is a request for the burst power function data. The burst power function data may include a first parameter indicating whether the memory device supports the burst power function, and a second parameter indicating the maximum power value(s) that can be requested by the memory device in the burst power function. The request 231 may be sent via a NVMe or PCIe interface (i.e., interfaces used for both data and management communication) or via system management bus (SMBus) or I3C bus (i.e., interfaces used for management).

The burst power component 113 may check the burst power register 250 for the values of the parameters characterizing the burst power function. The burst power component 113 may determine, according to the value stored in the burst power register 250, whether the memory device 220 supports the burst power function, and the maximum power value(s) allowed in the burst power function when the memory device 220 supports the burst power function. For example, the burst power component 113 may determine whether the memory device 220 supports the burst power function by checking the value of the first parameter of burst power register 250, the burst power component 113 may determine the maximum power value(s) that can be requested by the memory device 220 in the burst power function when the memory device 220 supports the burst power function by checking the value of the second parameter of burst power register 250. FIG. 3A illustrates an example burst power register 350 and the example description 310 of the burst power register 350, including the mode and the maximum power value(s) provided by the respective mode. Referring to FIG. 3A, the normal operating power level is denoted by X, while the burst power mode corresponds to a maximum power value Y1, Y2, Y3, etc. The maximum power value provided by the burst power mode may include multiple values such that the host system 120 can choose a value among them such that the value is supported by the host system. Each of the maximum power value Y1, Y2, Y3, etc. is higher than the normal operating power level X.

Referring to FIG. 3A, a first bit of the burst power register 350 may reflect the first parameter that indicates whether the memory device 220 supports the burst power function. The first bit can be set to bit 0 or bit 1, where bit 0 means that the memory component does not support a burst power function, and bit 1 means that the memory component supports a burst power function. The first bit can be set during the development and manufacturing of the memory device 220, and thus can be read-only. A second bit of the burst power register 350 may reflect the second parameter that indicates one or more maximum power values provided by the burst power function. For example, if the burst power function is supported, the second bit may indicate one or more values (e.g., Y1, Y2, Y3, etc.), and each value represents a maximum power value provided by the burst power function. In some implementations, a third bit of the burst power register 350 may reflect a third parameter that indicates a normal operating power level (e.g., X) provided by the normal power mode.

The burst power component 113 may send a response 233 to the host system 120, where the response 233 is a response to the request 231 and may include values of the parameters characterizing the burst power function. The response 233 may include values of the parameters characterizing regarding whether the memory device supports the burst power function, and the maximum power value(s) that can be requested by the memory device in the burst power function if the memory device supports the burst power function. In some implementations, the host system 120 may store the values of the parameters characterizing the burst power function for each of the memory devices (e.g., memory device 220), and an example of a data structure storing such information will be illustrated with respect to FIG. 3B.

The host system 120 can include a device or circuitry configured to monitor a power state metric (e.g., a parameter of a power supply) and detect an event associated with the power state metric (e.g., a parameter of a power supply) satisfies a threshold criterion. The power state metric may be one or more parameters associated with power supplied, including voltage, current, etc. In some embodiments, the host system 120 can monitor the values of voltages passing through it and other components of the host system 120. In some embodiments, the host system 120 can detect increases and decreases in voltages and generate signals that indicate voltage values or indicate that the voltage or a change in the voltage satisfies a threshold criterion. For example, the host system 120 can detect a drop in voltage below a predetermined threshold that is indicative of a power loss event and generate a signal to be transmitted to other components of host system 120. In some embodiments, the host system 120 can use a voltage drop detector (VDET) in a form of hardware so that the imminent power loss event can be rapidly detected. In some embodiments, the host system 120 can detect a rapid change in the voltages (e.g., at the interface or the input/output pin) over a short period of time.

The host system 120 can detect an imminent power loss by determining that a power state metric associated with the host system 120 (e.g., a value of a parameter of a power supply measured at a component that is connected with the host system 120) satisfies a threshold criterion. For example, the host system 120 may compare the power state metric to a threshold criterion in order to determine whether an imminent power loss event occurs. Upon detecting an imminent power loss, the host system 120 can send an indication (e.g., an APL notification) to controllers (e.g., controllers 115, 135, 225), memory devices (e.g., memory devices 130, 140, 220) and their constituent components. In some implementations, the host system 120 can send a power loss notification (PLN) 235 to the memory sub-system 110 or the burst power component 113. The PLN 235 may be sent as a signal transmitted via a specific pin (e.g., side-band pin) or a command via the NVMe or PCIe interface.

Figure 3B:
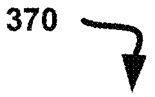
FIG. 3B illustrates an example data structure storing information associated with burst power function in accordance with some embodiments of the present disclosure.

In some implementations, the host system 120 may maintain a data structure to store information associated with the burst power function for each memory sub-system or each memory device. Referring to FIG. 3B, the data structure 370 may record the values of the parameters characterizing the burst power function using multiple entries, where each entry may include a memory device identifier, a burst power support flag, a burst power setting, and a PLN flag. For example, the memory device field may record a value that can be used to identify the memory device, the burst power support field may record the value of the first parameter indicating whether the memory device supports the burst power function, the burst power setting field may record the value of the second parameter indicating the maximum power value(s) (can be one value or multiple values) provided by the burst power function, and the PLN field may record a value that can be used to indicate whether PLN is sent to the memory device such that the memory device can enable the burst power function.

The host system 120 may check the values of the parameters characterizing the burst power function (e.g., data structure 370) to determine whether the memory sub-system 110 (or the memory device 220) supports a burst power function. Responsive to determining that the memory sub-system 110 (or the memory device 220) supports the burst power function (e.g., the value in the burst power support field in the data structure 370), the host system 120 may check the maximum power value(s) that can be requested by the memory sub-system in the burst power function (e.g., the value in the burst power setting field in the data structure 370). In some cases, when there is one maximum power value provided by the burst power function (e.g., there is one value in the burst power setting field in the data structure 370), the host system 120 may determine whether it has the capability to provide this power value, and responsive to determining that it has such capability, the host system 120 may send this power value as a selection of the maximum power value. In some cases, when there are multiple maximum power values provided by the burst power function (e.g., there are multiple values in the burst power setting in the data structure 370), the host system 120 may determine whether it has the capability to provide each of these maximum power values, and select the largest value that it can support among these maximum power values as a selection of the maximum power value. In some cases, when there are multiple maximum power values provided by the burst power function (e.g., there are multiple values in the burst power setting in the data structure 370), the host system 120 may determine that it has the capability to provide each maximum power value, and select a value randomly among these maximum power values as a selection of the maximum power value.

Along with PLN 235, the host system 120 can send the selection of the maximum power value provided by the burst power function. For example, the host system 120 can send a notification that the host system 120 can support the maximum power value Y1. In some implementations, the maximum power value(s) allowed in the burst power function may include multiple maximum power values, and the burst power component 113 can receive, from the host system 120, a selection of one maximum power value among the multiple maximum power values provided by the burst power function. In some implementations, the host system 120 can make the selection according to capability of the host system 120, e.g., the maximum supported power value.

Upon receiving the PLN 235 and the maximum power value, the burst power component 113 may switch the memory sub-system 110 (or the memory device 220) from the normal power mode to the burst power mode by enabling the burst power function. When the memory sub-system 110 operates in the normal power mode, the host system 120 allows the memory sub-system 110 to draw a normal operating power level (e.g., X) to perform pending operations. When the memory sub-system 110 operates in the burst power mode, the host system 120 allows the memory sub-system 110 to draw a higher-than-normal maximum power (e.g., Y1, Y2, Y3) to perform pending operations.

Enabling the burst power function may involve changing a parameter in a configuration file of the memory sub-system 110, such as changing a parameter that indicates whether the burst power function in enabled or not. As the example illustrated in FIG. 3A, the burst power component 113 may change the fourth bit of the burst power register 350, where the fourth bit of the burst power register 350 may reflect the fourth parameter indicating whether a burst power function of the memory sub-system 110 (or the memory device 220) is enabled or not. The fourth bit can be set to bit 0 or bit 1, where bit 0 means that the burst power function of the memory component is not enabled, and bit 1 means that the burst power function of the memory component is enabled. The fourth bit can be preset default as bit 0, and can be read-write.

Upon enabling the burst power function, the burst power component 113 may utilize a power level, provided by the host system 120, in the maximum power value that is received from the host system. That is, the burst power component 113 may draw from the host system 120 the power level based on the power budget defined according to the maximum power value provided by the burst power function. For example, when the burst power component 113 receives a notification that the host system 120 supports the maximum power value Y1, the burst power component 113 may allow the memory sub-system 110 to utilize the power under the power budget defined by the maximum power value Y1 to complete the pending operations, where the maximum power value Y1 represents the higher-than-normal maximum power for pending operations.

The pending operations may include data flushing operations. In some implementations, the data flushing operations may represent the operations related to transmission of data that is essential to ensure the integrity of the data saved in the memory sub-system 110 and prevent the loss of critical system data and metadata. For example, the higher-than-normal maximum power may allow the memory sub-system 110 to modify the execution of commands and the transfer of data in the memory sub system 110 and store system data and metadata in a non-volatile memory device, such as the memory device 220, to ensure the integrity of the data saved in the memory sub-system 110 and prevent the loss of critical system data and metadata. In some embodiments, modifying the execution of commands and the transfer of data in the memory sub system 110 may involve marking, as uncompleted or invalid, the pending operations and the operations currently being performed but unfinished (such that when the power is back on, the host system can understand the status of these pending operations). In some embodiments, modifying the execution of commands and the transfer of data in the memory sub system 110 may involve clearing the queue which holds the pending operations (such that when the power is back on, the host system can resend the request for these pending operations). In some implementations, making the operations and/or clearing the queue can company with collecting and/or transmitting the related information. For example, the information related to marking and/or clearing can include data about the status of operations and the status of the data sets that were transmitted or pending in the queue (e.g., data indicating completion/execution of a command or indicating transmission of information to the memory device). The information regarding marking and/or clearing may be collected as essential data, which can be stored to a non-volatile memory device.

By using extra power provided by the higher-than-normal maximum power, the memory sub-system 110 can store essential data before a loss of power occurs. The essential data may include data regarding the current open blocks, the last wordline or sub-block used, the current location of a media scan, the current time and date data, the read disturb data (e.g., read disturb counters), other error-related data, the last updated entry in the logical to physical (L2P) mapping data structure. The current open block data may include the identification (e.g., physical address or logical address) of a block being open. The last wordline or sub-block used data may include the identification (e.g., physical address or logical address) of the wordline or sub-block that was last used. The current location of a media scan data may include the identification of a location in a media last scanned. The current time and date data may include the time and date information when data being collected. The read disturb data refers to data of error (e.g., count) where a read to one wordline impacts the threshold voltages of unread cells in different wordlines of the same block. The essential data may reflect data that has been retrieved most recently, and the system can add a timestamp to the designated data. For example, the data can be retrieved at the time of detecting an imminent power loss event. In another example, the data can be retrieved at a time prior to the detection, such as the last time the data retrieved. In some examples, the processing device retrieves the essential data at a predetermined frequency and stores the essential data in a volatile memory device, and in this case, it can prevent any delay caused by gathering essential data.

Figure 5:
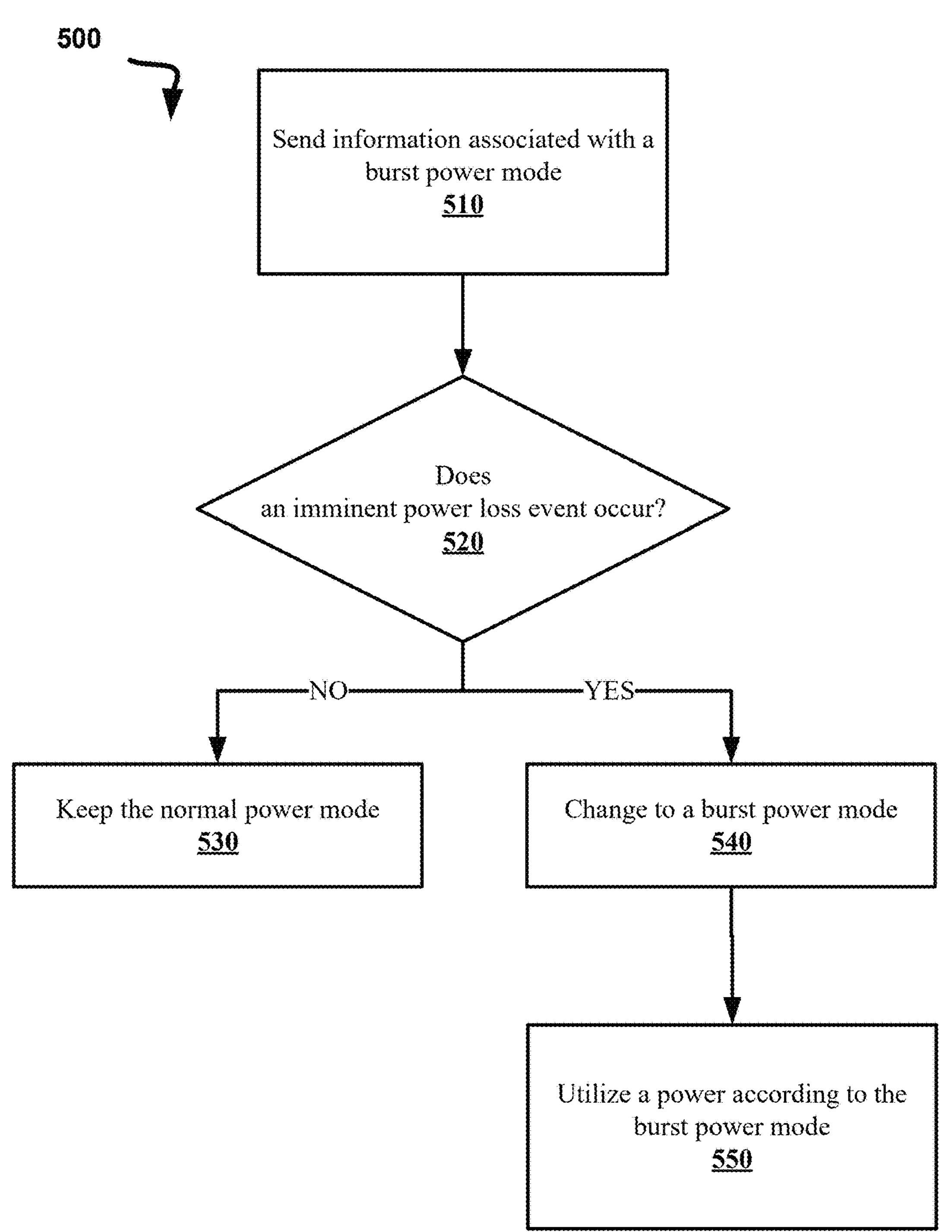

FIGS. 4 and 5 are flow diagrams of example methods 400 and 500 for implementing a burst power function for APL, in accordance with some embodiments of the present disclosure. The methods 400 and 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the methods 400 and 500 are performed by the burst power component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic can receive, from a host system (e.g., the host system 120), a request (e.g., request 231) for the burst power mode data associated with the memory device (e.g., memory device 220), where the burst power mode increases a value that represents power drawn from the host system for use by the memory device (i.e., the burst power mode provides a maximum power value higher than a normal operating power value in a normal power situation). In some implementations, the processing logic can receive the request as a part of a power-on sequence of the host system. In some implementations, the system (e.g., memory sub-system 110) or the memory device (e.g., memory device 220) is not implemented with a power loss protection circuitry.

At operation 420, the processing logic can send, to the host system (e.g., the host system 120), a response (e.g., response 233) to the request, where the response comprises burst power mode data associated with the memory device, and the burst power mode data comprises a first parameter (e.g., first bit of the burst power register 350) and a second parameter (e.g., second bit of the burst power register 350), wherein the first parameter specifies that the memory device supports the burst power mode, and wherein the second parameter specifies at least one maximum power value provided by the burst power mode. In some implementations, at least one of the first parameter and the second parameter is stored in a register of the memory device. In some implementations, at least one of the first parameter and the second parameter is pre-configured during manufacturing of the memory device.

In some implementations, the processing logic can receive, from the host system (e.g., the host system 120), the power loss notification (e.g., PLN 235) as a pin signal or an in-band command. In some implementations, the second parameter specifies a plurality of maximum power values including the at least one maximum power value, and the processing logic can receive, from the host system, a selection of the at least one maximum power value among the plurality of maximum power values. In some implementations, the selection is made according to a data structure (e.g., data structure 370) stored in the host system. In some implementations, the first parameter and the second parameter are stored in a memory location (e.g., register 350) of the memory device. In some implementations, the first parameter and the second parameter are pre-configured during manufacturing of the memory device.

At operation 430, responsive to receiving a power loss notification from the host system, the processing logic can enable the burst power mode (i.e., switch from the normal power mode to the burst power mode), where the power loss notification indicates that a power loss event is expected to occur. In some implementations, enabling the burst power mode comprises changing a third parameter, wherein the third parameter specifies whether the burst power mode is enabled in the memory device.

In some implementations, the host system can determine whether the parameter of the power supply satisfies a threshold criterion by monitoring the voltage at a power supply terminal in the memory device or an interface of the memory device, and when the change of the voltage exceeds a certain threshold value or the value of the voltage is below a certain threshold value, the host system determines that the parameter of the power supply satisfies the threshold criterion. In some implementations, responsive to determining that the parameter of the power supply satisfies the threshold criterion, the host system can send the power loss notification to the processing logic.

At operation 440, the processing logic can identify one or more data flushing operations to be performed based on a power budget defined according to the maximum power value provided by the burst power mode and cause the one or more data flushing operations to be performed. That is, the processing logic can utilize a power, provided by the host system, according to the at least one maximum power value. In some implementations, the processing logic can disable the burst power mode (i.e., reset to the normal power mode) upon detecting a power up event after the power loss event. In some implementations, the power is utilized to replace a power provided by a power loss protection circuitry. In some implementations, the power is utilized to perform an operation that is supposed to be powered by a power loss protection circuitry.

In some implementations, the one or more data flushing operations may include programing essential data to a designated location on the memory device. In some implementations, the essential data comprises at least one of: current open block data, last-used wordline data, last-used sub-block data, current location data of a media scan, current time data, or read disturb data. In some implementations, the designated location comprises a single level cell (SLC) block. In some implementations, the designated location may be predetermined and stored as metadata such that the processing logic can access. In some implementations, the processing logic decides a location as the designated location based on the memory locations that are accessible to it.

In some implementations, the processing logic can utilize the power to stop the performance of operations. In some implementations, stopping the performance of operations can involve stopping execution operations and/or stopping data transmission. In some implementations, stopping the performance of operations can involve marking the pending or unfinished operations as incomplete or invalid, for example, by an indicator (e.g., a flag bit) and save it as the essential data. In some implementations, stopping the performance of operations can involve clearing a queue of pending operations.

Referring to FIG. 5, at operation 510, the processing logic can send information associated with a burst power mode. In some implementations, the information associated with a burst power mode may include a response to the request described at operation 420, and the processing logic can send the response as described at operation 420. In some implementations, the information associated with a burst power mode may include a first parameter (e.g., first bit of the burst power register 350) and a second parameter (e.g., second bit of the burst power register 350), wherein the first parameter specifies that the memory device supports the burst power mode, and wherein the second parameter specifies at least one maximum power value provided by the burst power mode, and the processing logic can send the information at a predetermined frequency and store the information on a memory location (e.g., burst power register 250).

At operation 520, the processing logic can receive (e.g., from the host system) a notification of an imminent power loss. In some implementations, the processing logic can receive, from the host system (e.g., the host system 120), the power loss notification (e.g., PLN 235) as a pin signal or an in-band command. At operation 530, responsive to determining that the imminent power loss event has not occurred, the processing logic can keep the normal power mode. Keeping the normal power mode may involve utilizing a power, provided by the host system, according to a normal operating power value (e.g., X) provided in the normal power mode.

At operation 540, responsive to determining that the imminent power loss event occurs, the processing logic can change the operation from a normal power mode to a burst power mode. In some implementations, operation 540 can be the same as or similar to operation 430. At operation 550, the processing logic can utilize a power, provided by the host system, according to the burst power mode. In some implementations, operation 550 can be the same as or similar to operation 440.

Figure 6:
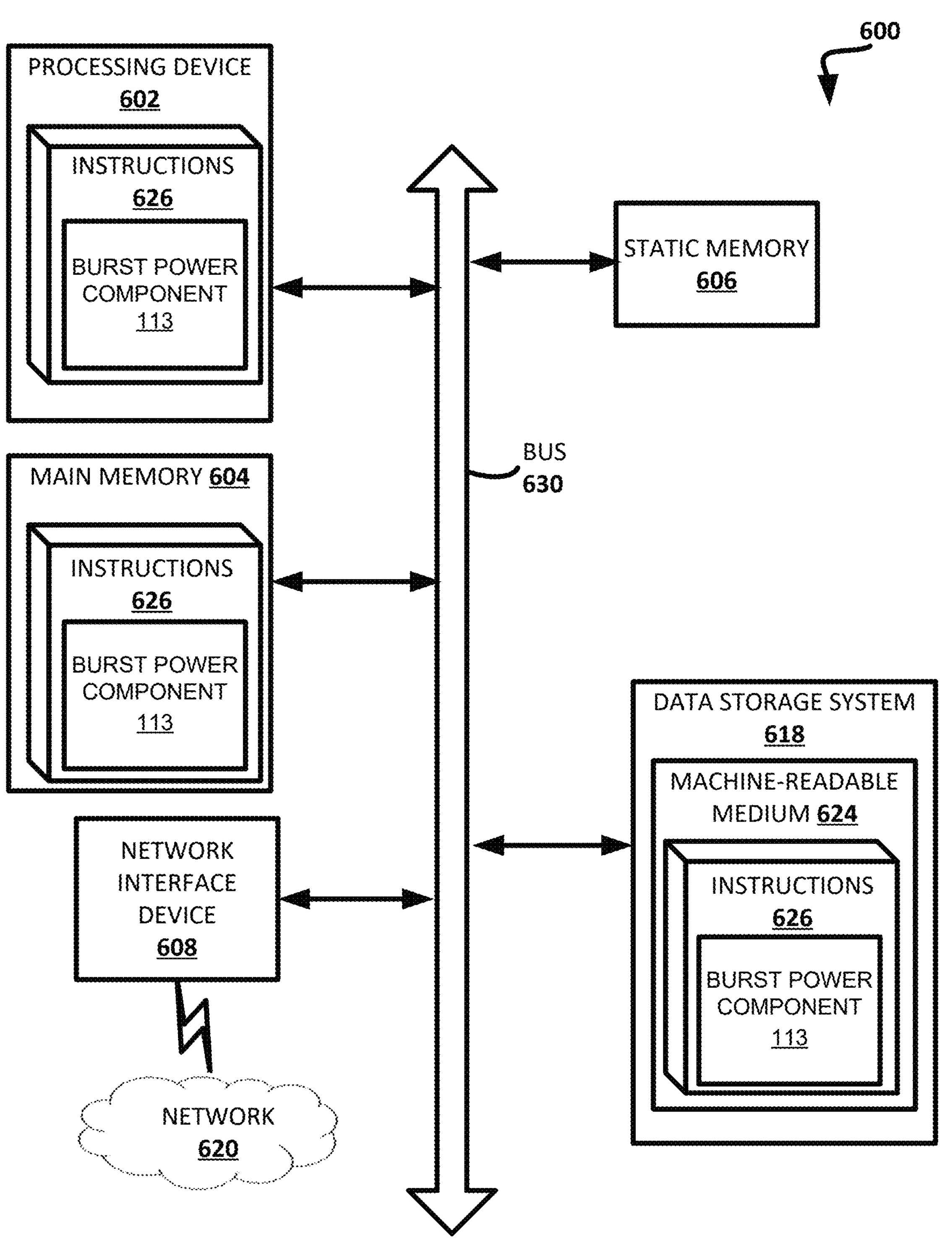
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the burst power component of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a burst power component (e.g., the burst power component 113 of FIG. 1). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:

a memory device; and a processing device, operatively coupled with the memory device, to perform operations comprising:

sending, to a host system, burst power mode data associated with the memory device, wherein the burst power mode data comprises a first parameter and a second parameter, wherein the first parameter indicates that the memory device supports a burst power mode, wherein the second parameter specifies a maximum power value provided by the burst power mode;

receiving a power loss notification from the host system;

responsive to receiving the power loss notification, enabling the burst power mode;

identifying one or more data flushing operations to be performed based on a power budget defined according to the maximum power value provided by the burst power mode; and causing the one or more data flushing operations to be performed.

2. The system of claim 1, wherein the second parameter specifies a plurality of maximum power values including the maximum power value, and wherein the operations further comprise:

receiving, from the host system, a selection of the maximum power value of the plurality of maximum power values.

3. The system of claim 1, wherein the operations further comprise:

receiving, from the host system, a request for the burst power mode data.

4. The system of claim 1, wherein enabling the burst power mode comprises changing a third parameter, wherein the third parameter specifies whether the burst power mode is enabled in the memory device.

5. The system of claim 1, wherein at least one of the first parameter and the second parameter is pre-configured during manufacturing of the memory device.

6. The system of claim 1, wherein the operations further comprise:

disabling the burst power mode upon detecting a power up event after a power loss event.

7. The system of claim 1, wherein the one or more data flushing operations comprise programming essential data to a designated location on the memory device.

8. A method comprising:

sending, by a processing device, to a host system, burst power mode data associated with a memory device, wherein the burst power mode data comprises a first parameter and a second parameter, wherein the first parameter indicates that the memory device supports a burst power mode, wherein the second parameter specifies a maximum power value provided by the burst power mode;

receiving a power loss notification from the host system;

responsive to receiving the power loss notification, enabling the burst power mode;

identifying one or more data flushing operations to be performed based on a power budget defined according to the maximum power value provided by the burst power mode; and causing the one or more data flushing operations to be performed.

9. The method of claim 8, wherein the second parameter specifies a plurality of maximum power values including the maximum power value, and wherein the operations further comprise:

receiving, from the host system, a selection of the maximum power value of the plurality of maximum power values.

10. The method of claim 8, further comprising:

receiving, from the host system, a request for the burst power mode data.

11. The method of claim 8, wherein enabling the burst power mode comprises changing a third parameter, wherein the third parameter specifies whether the burst power mode is enabled in the memory device.

12. The method of claim 8, wherein at least one of the first parameter and the second parameter is pre-configured during manufacturing of the memory device.

13. The method of claim 8, further comprising:

disabling the burst power mode upon detecting a power up event after a power loss event.

14. The method of claim 8, wherein the one or more data flushing operations comprise programming essential data to a designated location on the memory device.

15. A non-transitory computer-readable storage medium comprising instructions that, when executed by a processing device, cause the processing device to perform operations comprising:

sending, to a host system, burst power mode data associated with a memory device, wherein the burst power mode data comprises a first parameter and a second parameter, wherein the first parameter indicates that the memory device supports a burst power mode, wherein the second parameter specifies a maximum power value provided by the burst power mode;

receiving a power loss notification from the host system;

responsive to receiving the power loss notification, enabling the burst power mode;

identifying one or more data flushing operations to be performed based on a power budget defined according to the maximum power value provided by the burst power mode; and causing the one or more data flushing operations to be performed.

16. The non-transitory computer-readable storage medium of claim 15, wherein the second parameter specifies a plurality of maximum power values including the maximum power value, and wherein the operations further comprise:

receiving, from the host system, a selection of the maximum power value of the plurality of maximum power values.

17. The non-transitory computer-readable storage medium of claim 15, wherein the operations further comprise:

receiving, from the host system, a request for the burst power mode data.

18. The non-transitory computer-readable storage medium of claim 15, wherein enabling the burst power mode comprises changing a third parameter, wherein the third parameter specifies whether the burst power mode is enabled in the memory device.

19. The non-transitory computer-readable storage medium of claim 15, wherein at least one of the first parameter and the second parameter is pre-configured during manufacturing of the memory device.

20. The non-transitory computer-readable storage medium of claim 15, wherein the operations further comprise:

disabling the burst power mode upon detecting a power up event after a power loss event.

* * * * *